C. H. CORNELL.
RAILWAY FASTENING.
APPLICATION FILED NOV. 6, 1908. RENEWED JULY 30, 1909.
943,522.
Patented Dec. 14, 1909.
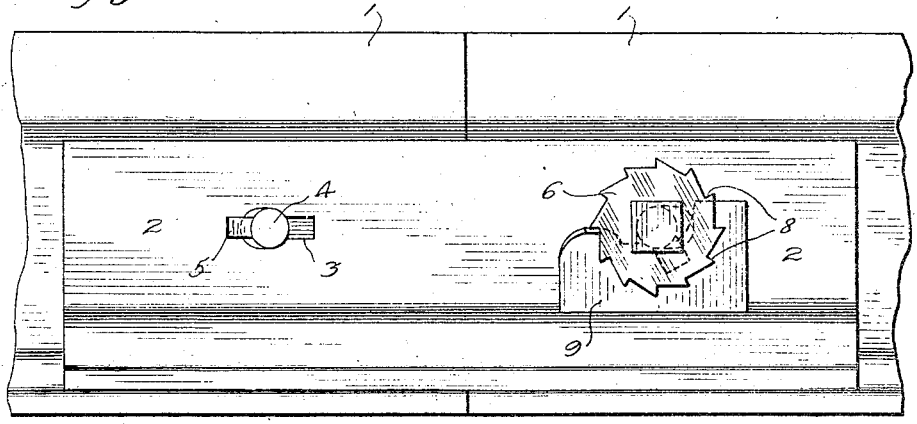
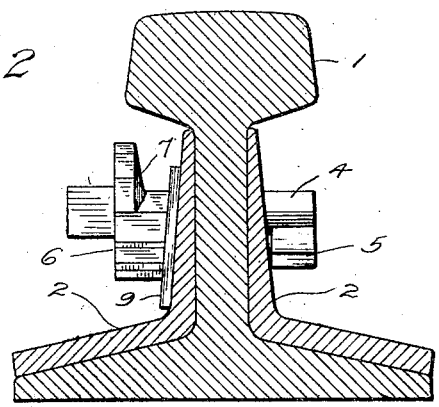
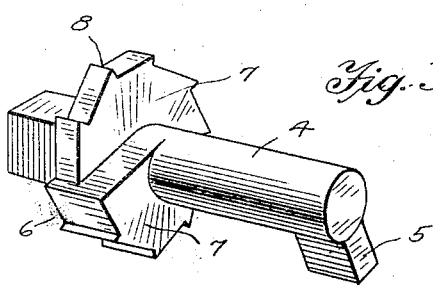
Witnesses
R. C. Claflin
Ernest R. Hutchinson
Inventor
Charles H. Cornell
By Cham Bro's
Attorneys

UNITED STATES PATENT OFFICE.

CHARLES H. CORNELL, OF VALENTINE, NEBRASKA.

RAILWAY-FASTENING.

943,522.    Specification of Letters Patent.    Patented Dec. 14, 1909.

Original application filed May 16, 1908, Serial No. 433,243. Divided and this application filed November 6, 1908, Serial No 461,404. Renewed July 30, 1909. Serial No. 510,414.

*To all whom it may concern:*

Be it known that I, CHARLES H. CORNELL, a citizen of the United States, residing at Valentine, in the county of Cherry and State of Nebraska, have invented certain new and useful Improvements in Railway-Fastenings; and I do hereby declare the following to be a full, clear, and exact description of the invention, such as will enable others skilled in the art to which it appertains to make and use the same.

My invention relates to rail fastenings for railway tracks and is a division of my application filed May 16, 1908, Serial No. 433,243.

It has for its object to provide an improved fastening which is inexpensive and may be quickly adjusted because it does not require the use of screws, spikes or rivets.

Another object is to provide a fastening bolt which may be adjusted to have the proper clamping action and be locked at any desired point even though this point should not be the same in any two bolts.

Further objects of the invention will become apparent from the following description.

The invention contemplates the use of integral bolts each provided with a laterally extending lug formed at one end and a head at the other end adapted to clamp upon a part to be fastened. The shanks of the bolts with their lugs are passed through key slots with said lugs engaging one face of the part in which the slots are formed. If the face engaged by said lugs is beveled, the turning of the bolts with their lugs riding upon said beveled surface will give the desired clamping action. Where the face of the slotted part is not beveled, I provide the heads of the bolts with spiral cam-shaped inner faces which produce the desired clamping effect when said bolts are turned. It will be understood, of course, that the spiral cam-shaped heads may be used when the surface of the slotted part engaged by the lugs is also beveled, the result being that the clamping action is obtained by turning the bolts a much less degree than is required when either face of the slotted part is not beveled or the inner faces of the heads are not cam-shaped.

The invention consists in features of the construction and combination of parts hereafter described and specified in the claims.

In the accompanying drawing, illustrating the preferred embodiment of my invention: Figure 1 is a side elevation of the ends of two rails with their fish plates fastened together with bolts in accordance with my invention. Fig. 2 is a cross sectional view thereof, and Fig. 3 is a detailed view of one of the bolts.

Referring more particularly to the drawing, 1 designates the ends of two rails which are supported by fish plates 2 preferably tapered upwardly as shown in Fig. 2. Key slots 3 are formed through the fish plates and the webs of the rails. The bolts 4 are preferably passed through said slots alternately from the opposite sides of the rails. The lug 5 at one end of each bolt engages one of the fish plates while the head 6 on the other end of said bolt comes in contact with the other fish plate. Because of the beveled or inclined faces of said fish plates, the turning of the bolts produces a clamping action thereon which forces them tightly against the sides of the webs of the rails thereby securely locking the two rails together.

I have shown the heads of the bolts provided with spiral cam-shaped inner faces 7 which, when the bolts are turned, will give the desired clamping effect independently of the beveled or inclined faces of the fish plates. In other words, the bolts provided with cam-shaped heads may be used with satisfactory results in connection with fish plates which have straight vertical faces.

The edges of the heads of the bolts are serrated as at 8 and washers 9 are arranged between the said heads and the fish plates so that portions thereof may be bent out into engagement with the serrations for locking the bolts in position and prevent reverse turning thereof. The lower edges of the washers preferably rest upon the base flanges of the fish plates, whereby they are prevented from turning.

I claim:

1. The combination, with two rails and fish plates having registering key slots therein, of rotatable bolts having their shanks extended through said slots, laterally projecting lugs on the ends of said bolts, heads on the other ends thereof having cam-shaped inner faces whereby a clamping action is had by turning said bolts, said heads also provided with serrations in their edges, and means adapted to engage said serrations to lock said bolts against reverse turning.

2. The combination, with two rails and fish plates having registering key slots therein, of rotatable bolts having their shanks extended through said slots, laterally projecting lugs on the ends of said bolts, heads on the other ends thereof having cam-shaped inner faces whereby a clamping action is had by turning said bolts, said heads also provided with serrations in their edges, and washers adapted to have portions thereof bent up into engagement with said serrations for the purpose specified.

3. The combination, with two rails and fish plates having registering key slots therein, of rotatable bolts having their shanks extended through said slots, laterally projecting lugs on the ends of said bolts, heads on the other ends thereof, said fish plates being tapered upwardly whereby a clamping action is had by turning said bolts, and means to lock said bolts against reverse turning.

4. The combination, with two rails and fish plates having registering key slots therein, of rotatable bolts having their shanks extended through said slots, laterally projecting lugs on the ends of said bolts, heads on the other ends thereof, said fish plates being tapered upwardly whereby a clamping action is had by turning said bolts, said heads having serrations in their edges, and washers adapted to have portions thereof bent up into engagement with said serrations for the purpose specified.

In testimony whereof, I affix my signature, in presence of two witnesses.

CHARLES H. CORNELL.

Witnesses:
 GLEN V. HOENIG,
 M. V. NICHOLSON.